(12) United States Patent
Mikkonen et al.

(10) Patent No.: US 7,687,477 B2
(45) Date of Patent: Mar. 30, 2010

(54) POLYMER SOLUTION AND DISPERSION AND A PROCESS FOR THE PREPARATION THEREOF

(75) Inventors: Hannu Mikkonen, Rajamäki (FI); Maarit Tarvainen, Rauma (FI); Soili Peltonen, Rajamäki (FI); Timo Petteri Paronen, Kuopio (FI)

(73) Assignee: Valtion Teknillinen Tutkimuskeskus, Espoo (FI)

(*) Notice: Subject to any disclaimer, the term of this patent is extended or adjusted under 35 U.S.C. 154(b) by 947 days.

(21) Appl. No.: 10/528,993

(22) PCT Filed: Sep. 25, 2003

(86) PCT No.: PCT/FI03/00700

§ 371 (c)(1),
(2), (4) Date: Jan. 11, 2006

(87) PCT Pub. No.: WO2004/029097

PCT Pub. Date: Apr. 8, 2004

(65) Prior Publication Data

US 2006/0148943 A1   Jul. 6, 2006

(30) Foreign Application Priority Data

Sep. 27, 2002   (FI) .................. 20021730

(51) Int. Cl.
*A61K 31/717* (2006.01)
*A61K 31/718* (2006.01)

(52) U.S. Cl. .............. 514/54; 514/23; 514/57; 514/60; 524/112

(58) Field of Classification Search ......... 524/112; 514/23, 54, 57, 60
See application file for complete search history.

(56) References Cited

U.S. PATENT DOCUMENTS

| 4,849,055 A | 7/1989 | Yoshioka et al. |
| 5,292,782 A | 3/1994 | Bastioli et al. |
| 5,462,983 A | 10/1995 | Bloembergen et al. |
| 6,066,368 A | 5/2000 | Billmers et al. |
| 6,585,859 B1 | 7/2003 | Hakansson |
| 2001/0021733 A1 | 9/2001 | Peltonen et al. |

FOREIGN PATENT DOCUMENTS

| EP | 0 224 976 B1 | 6/1987 |
| EP | 0 350 668 B1 | 1/1990 |
| FI | 92618 | 1/1988 |
| FI | 94535 | 6/1994 |
| FI | 105566 B | 7/1998 |
| JP | 56-139539 A | 10/1981 |
| SE | 513602 | 8/2000 |
| WO | WO-94/13883 A1 | 6/1994 |
| WO | WO-97/35068 A1 | 9/1997 |
| WO | WO 97/49762 | * 12/1997 |
| WO | WO-97/49762 A1 | 12/1997 |
| WO | WO-98/29477 A1 | 7/1998 |
| WO | WO-01 00927 A1 | 1/2001 |

OTHER PUBLICATIONS

Yoshioka et al, Mol. Cryst. and Liq. Cryst., 2000, 353, 59-73.*
Yoshioka et al., Mol. Cryst. and Liq. Cryst., 2000, vol. 33, pp. 59-73.

* cited by examiner

*Primary Examiner*—Shaojia Anna Jiang
*Assistant Examiner*—Ganapathy Krishnan
(74) *Attorney, Agent, or Firm*—Birch, Stewart, Kolasch & Birch, LLP (57) ABSTRACT

A polymer dispersion or solution containing a hydrophobic polysaccharide, which is dispersed or dissolved in liquid phase, and plasticizer composition of the polysaccharide, whereby at least 10% by weight of the plasticizer composition is formed from alkenyl succinic anhydride. The invention also relates to the preparation of polymer dispersions and solutions and to the films and coatings produced from them. The dispersions according to the invention are stable, and coating with excellent film-forming properties can be prepared from them.

13 Claims, 4 Drawing Sheets

POLYMER SOLUTION AND DISPERSION AND A PROCESS FOR THE PREPARATION THEREOF

The present invention relates to solutions and dispersions of biodegradable polymers. In particular, the invention relates to the polymer solutions and dispersions according to the preamble of claim 1, which contain a hydrophobic polysaccharide dispersed or dissolved in liquid phase and a plasticizer of the polysaccharide.

The invention also relates to the coating/film according to the preamble of claim 13 and to a process for preparing a hydrophobic polymer solution and dispersion, according to which method (a) a mixture consisting of a biopolymer, plasticizing agent, dispersion admixtures and water is formed, (b) said mixture is heated to form a paste-like composition, and (c) the paste-like composition is diluted in water.

Polymers are widely used in the plastics and paint industries in particular, and in various food and pharmaceutical applications. One of the most important reasons to use polymer is its ability to form a uniform film that can be used, for example, in protecting products (pieces of furniture, strawberries or tablets) against various forms of stress or negative effects of the environment. The film can be prepared by evaporating the organic dissolvent contained in the polymer solution or the water contained in the polymer dispersion. Such polymer films often have the weakness that the polymer alone forms a brittle and hard film, which does not endure even the slightest bending or stress. Therefore, an agent having a low molecular weight, a plasticizer, is added into the films, making the film flexible and more wear-resistant.

The emphasis on an environmentally friendly attitude and green values is opening up new markets for products based on renewable natural resources. Such trends are emerging, among others, in the packaging industry, the sanitary products industry and the adhesives industry, where recyclability, reuse, compostability, biodegradability and lack of environmental stress are demands of today. Emphasis is also placed on a trend to substitute processed biopolymer products for petrochemical products. Starch and its derivatives constitute an especially interesting initial material for the manufacture of biodegradable polymer products. Other essential biodegradable or compostable polymers include cellulose derivatives, polycaprolactone, polylactide and other polymers and copolymers based on lactic acid, such as polyester urethanes.

One of the greatest challenges of the pharmaceutical industry, among others, in coating pharmaceutical preparations is the shift from coating based on organic solvents to environmentally friendly, water-based coating implemented by means of polymer dispersions. In that case, it is possible to considerably decrease the solvent wastes generated by the industry, which are extremely expensive and laborious to process.

In technical applications, for example, polymer dispersions are used in coating paper and board to improve their water resistance. In addition to fillers, the dispersions used in the paper industry today contain various synthetic latexes, which are quite poor in decomposing in a biological environment.

A quite interesting object of use for biopolymer films is also the coating of pharmaceutical tablets, wherein the coating is required to have both a good permanence and strength, and it should be possible to modify the coating to release the drug under biological conditions.

A hydrophobic dispersion has been known previously, wherein at least the majority of the components, preferably essentially all of them, are biodegradable (FI Patent No. 105566) and consist, for example, of starch or its derivative and/or lactic acid based polymers and copolymers. In the known method, a stable dispersion is prepared from a biodegradable polymer by forming from the polymer in question, a plasticizer, dispersion admixtures and water, a preliminary paste-like blend, which is heated, after which the composition is diluted/dispersed in water. In that case, no solvents are needed to form the dispersion, which solvents must be evaporated, but dispersion can be carried out in a conventional dispersion device or even a mixer. The polymer does not need to be dried before dispersion.

The technical solution according to FI Patent No. 105566 employs, as plasticizing agents, monomer plasticizing agents known per se, such as triacetin, diacetin and triethyl citrate.

Films made of the known dispersions have a good water-repellence and they can be used to considerably improve the water resistance of paper or board. The dispersions also have good adhesion properties. Accordingly, the polymer dispersions can be used for coating paper or board, as primers, sizing components in water-soluble adhesives (such as labelling adhesives) or paint or lacquer components.

It is also well known to prepare dispersion from a biopolymer, such as a derivative of starch, by first melting the biopolymer in a plasticizer and then adding water.

Although the known dispersions have excellent properties and their range of use is extensive, it would be desirable to provide new solutions and dispersions of starch and its derivatives and corresponding biopolymers, which would yield products, films in particular, that have better mechanical properties and penetrability than before. Furthermore, it is desirable to provide new dispersions, which have better stability than before and which can be used to manufacture coatings that have especially good film-forming properties.

The present invention is based on the idea of using a cellulose derivative or a similar biopolymer, an anhydride of alkenyl succinic acid as a plasticizer of the biopolymer in dispersions or solutions containing starch or a starch derivative.

Dispersions containing an anhydride of alkenyl succinic acid and its esters are previously known. Such compositions are described in FI Published Patents Nos. 94535 and 92618, SE Published Patent No. 513 602, EP Published Applications Nos. 0 224 976 and 0 350 668, as well as WO Published Applications 97/35068 and 01/00927.

In known technology, stock or surface adhesives (hydrophobic sizes) have been prepared from ASA (alkylene succinic acid anhydride) and AKD (alkene ketenedimer wax). ASA or AKD are hydrophobic products, which are used to improve the water resistance of paper/board products. Water dispersions or solutions of a hydrophobic starch derivative have not been disclosed earlier. The starch derivative possibly used in the dispersions has the role of a stabilizer and it is water-soluble (cold or hot-water soluble according to the degree of substitution or the molecular weight).

FI Patent No. 94535 discloses the preparation of an ASA dispersion (a hydrophobic size) at a high pressure of 2 to 15 bar at a temperature of 100 to 200° C. Cationic starch is used as a stabilizer and, in addition, a surfactant is used. The formula contains no plasticizer.

SE Patent No. 513602 prepares a hydrophobic size from AKD or ASA. Cationic starch or amphoteric starch (DS 0.01-0.3) is used as the stabilizer of the dispersion, i.e., the composition is almost the same as in the previous patent. The product is used as stock adhesive.

FI Patent No. 92618 relates to a paper manufacturing method. An ASA-based dispersion is used as the stock adhesive, having been stabilized with a cationic tapioca starch (0.3% of nitrogen). Colloidal silicon dioxide has also been added into the dispersion. The chain length of ASA is ≧8, preferably $C_{12}$-$C_{36}$. The size formula contains no plasticizer; a surfactant is used in addition to the above.

EP Published Application No. 224 976 discloses a stock adhesive that uses a partial ester of ASA. The alkenyl chain of ASA is ≧C6 and unsaturated. The length of the ester chain is $C_3$-$C_{18}$ and unsaturated. In this case, the carboxylic acid of alkenyl succinate can be in a saline form (a water-soluble amine or alkali metal)), resulting in self-emulsifiability. Cationic starch can be used in stabilizing the dispersion and as a catalyst that enhances the sizing.

EP Published Application No. 350 668 A3 has prepared starch derivative blends, which are suitable for surface sizing. The blend/mixture consists of an ASA derivative of starch (octenyl succinate) and cationic starch (30/70-90/10). In addition, the blend contains 0.5-5% of Al salt. The length of the ASA carbon chain is $C_5$-$C_{14}$ and the degree of substitution of the starch DS is 0.005-0.1. Instead of the cationic starch, an anionic starch can also be used (containing phosphoric and sulphonic groups). Testing as surface adhesives with dispersions containing 2-20% of blend in water. The publication mentions no plasticizers.

The stock adhesive according to WO Published Application No. 97/35068 consists of ASA or AKD and hydrolysed cationic starch that has a charging density of 0.5-3.5 meqv/g and a degree of substitution of 0.4-1.0. The viscosity of the cationic starch is low (the viscosity of a 30% solution 10000 cps, 25° C.). The length of the alkyl chain in ASA or AKD is ≧8 and, in case of a cycloalkyl, ≧6. The ASA/cat starch is 10:1-1:1. The composition contains no plasticizing agent.

The stock emulsion or the surface adhesive emulsion according to WO Published Application No. 01/00927 A1 consists of ASA, positively charged colloidal silica, aluminium and zirconium particles. The substances are mixed together and added into chemical pulp or in surface sizing. The normal papermaking chemicals can be used.

Thus, it can be noted that not even one reference mentions the use of the anhydride of alkenyl succinic acid as the plasticizer of a composition.

Plasticizing refers to softening a stiff and organized structure of polymers. It is carried out by means of a non-volatile softener, which has a high boiling point and which cannot be distinguished from the structure of polymers. Softeners are used to provide flexibility, to improve the flowing properties and to decrease crystallinity (cf., e.g., Aqueous Polymeric Coatings for Pharmaceutical Dosage Forms" Ed. J. W. McGivity, 1997, the Latex Emulsions for Controlled Drug Delivery section). In plasticizing, the interacting forces between the molecules of the polymer decrease (the cohesion is reduced). Generally, this reduces the tensile strength, the softening point, and lowers the glass transition temperature.

In addition to external plasticizing, so-called internal plasticizing is also known, which is based on a chemical reaction between the plasticizing component and the main component of the composition. In the known solutions described above, the reaction between ASA and starch will not—in the aqueous conditions they are used in—reach a state where the starch product would be plasticized. Furthermore, a (base) catalyst is generally needed for the reactions of starch in aqueous systems and, nonetheless, the degrees of substitution remain low.

According to the present invention it has been found that octenyl succinic acid anhydride is capable of internal plasticization of starch. This is achieved by relatively high degrees of substitution, which are >1. The degree of substitution (DS) is preferably near the value 2, for example, about 1.5-2.5.

Uniform layers/films can be prepared from polymer dispersions/solutions, the thickness of the coatings/films being about 5-500 μm and which show excellent properties, for example, as polymeric coating agents and coatings of pharmaceutical products.

In the method according to the invention for preparing hydrophobic polymer dispersion, a mixture is formed from a biopolymer, a plasticizer (at least 10% by weight of which consists of an alkenyl succinic anhydride), dispersion admixtures and water, said mixture is heated to form a paste-like composition, and the paste-like composition is diluted in water.

More specifically, the polymer dispersion or solution according to the invention is characterized by what is stated in the characterizing part of claim 1.

The polymeric coating agent/the coating of pharmaceutical products according to the invention, in turn, is characterized by what is stated in the characterizing part of claim 13.

The process according to the invention for preparing hydrophobic polymer dispersion is characterized in that at least 10% by weight of the plasticizing agent consists of an alkenyl succinic anhydride.

The present invention provides considerable advantages. Thus, according to the invention, there are provided coated paper/board products and pharmaceutical coatings, which have a good water resistance (low Cobb values) and wherein the plasticized starch polymer forms a uniform and strong film on the surface of the product, or when used in sizing, glues two paper products together.

It has been possible to considerably decrease the water absorption of the product, when coating surface-sized paper/board with the coating according to the invention.

The new polymer dispersion formulations provide a better stability of dispersions, and better film-forming properties of the coatings prepared from them.

In the following, the present invention is studied more closely with the aid of a detailed description and working examples.

FIG. 1 shows an electron microscope image of the surface of a starch acetate solvent film that is softened with TEC (FIG. 1A) and DSA (FIG. 1B). The amount of softener is 50% of the mass of the polymer. Enlargement is 2000×.

FIG. 2 shows the moisture permeability (WVTR) of ethyl cellulose (FIG. 2A) and starch acetate (FIG. 2B) films as a function of the content of plasticizer. The permeability is defined at a relative humidity of 57.5% at a temperature of 25° C. (mean value±SD; n=3).

FIG. 4 shows an electron microscope image of the surface of a starch acetate dispersion film plasticized with a mixture of TEC-OSA (FIG. 4A) and with TA (FIG. 4B). The enlargement is 600×.

PREPARATION OF DISPERSIONS

According to the invention, dispersions of biodegradable polymers are preferably prepared in three stages, after which the dispersions can further be treated with modification chemicals to improve their water resistance, for example. If needed, the dispersions can also be homogenized.

First, a mixture is prepared from biopolymer, dispersion admixtures (including possible protective colloids) and water. Depending on the biopolymer, the mixture in question can possibly include, in addition to the polymer's plasticizer, also other admixtures and additives. The water contained in the mixture is part of the total amount of water of the dispersion. The mixture preferably contains 10-90%, more preferably about 20-80% of the total amount of water of the final dispersion, whereby the amount of water in the preliminary mixture is suitably 1-200 parts by weight, preferably about 50-150 parts by weight, in relation to 100 parts by weight of the polymer. The aim is to provide a sufficiently stable and viscous mixture. The mixture is rendered a homogeneous mass by efficient agitation.

The dispersion can also be prepared by a so-called melt dispersion process, which is described in detail in WO Published Application No. 97/49762 (Corex Polymer, Kuopio, Finland). The solution in question can be used to disperse a biodegradable polymer in water by first plasticizing it and by dispersing the plasticized melt in water. In that case, no solvents are needed for preparing the dispersion. Accordingly, in the known method a biodegradable polymer is used as the polymer, being first mixed with a plasticizing agent to produce a plasticized mixture, and the mixture is mixed with admixtures and water in an optional order to form a dispersion, mixing being carried out at an increased temperature.

When so desired, the dispersion thus obtained is homogenized.

Preferably, the dispersion admixtures are dissolved in or mixed with the water added into the preliminary mixture before mixing them together with the polymer.

In the second stage of the method, the mixture is heated to a temperature of about 20-100° C., preferably to about 40-60° C. The temperature varies according to the composition of the polymer and the dispersion used. Mixing is continued at this temperature, until a suitable, paste-like blend is obtained. In case of certain polymers, no actual heating stage is needed but, instead, the paste-like blend is obtained by continuing the mixing at room temperature.

Generally, the mixing times are evenly distributed between the formation and the heating stage of the blend. Depending on the amount of substances, the blend is mixed for about 1 min-24 h, preferably about 10 min-2 h at the first stage of the method, and about 1 min-24 h, preferably about 10 min-2 h at the second stage of the method. Typically, the total mixing time is about 5 min-4 h.

At the third stage of the invention, the rest of the amount of water calculated for the dispersion is added into the paste-like blend. The addition is preferably carried out gradually, effectively mixing the dispersion at the same time. According to a preferred embodiment of the invention, water is added into the paste at an increased temperature (=>20° C., e.g., at about 40-90° C.), whereby it has been found particularly advantageous to add water into the past while still hot, allowing the paste to cool at the same time.

However, it is also possible to dilute the paste in water at room temperature or even at a lower temperature. The water is most preferably added at such a pace that the plasticized mass remains uniform, and no phase separation takes place. During the addition, it should be seen to that the evaporating water is condensed and returned to the blend.

Although the forming of dispersion in water has been described above, various solvents can also be used as the medium of the dispersion.

According to a particularly advantageous embodiment, the dispersion is prepared so that 100 parts by weight of starch ester, 0-50 parts by weight, preferably 5-50 parts by weight of protective colloid and 10-200 parts by weight of plasticizer are mixed with 70-120 parts by weight of water, which has been mixed with 0.1-10 parts by weight of a surfactant, to form a starch ester blend, after initial mixing, the temperature of the blend is increased to 40-90° C. and mixing is continued until a white, paste-like composition is obtained, and 50-150 parts by weight of water are added into the said composition, while the temperature of the composition is allowed to lower to room temperature.

In case of cationic starch acetate, no protective colloid is needed.

After dispersion, if so desired, the dispersion is homogenized in a manner known per se to stabilize the same. The homogenisation can be provided, for example, by means of a pressure homogeniser. Homogenisation can be used to decrease the particle sized by 50-100% and, thus, to further improve the stability of the dispersion. The dispersions according to the invention are stable for several weeks, even months.

As mentioned above, the water resistance of the dispersions can further be improved by means of cross-linking chemicals. These include, for example, glycosal, and aluminium and zirconium salts. Regarding aluminium salts, aluminium acetyl acetonate can be cited in particular. Generally, the amounts of cross-linking chemicals in use are about 0.01-30%, preferably about 0.1-10%, more preferably about 0.5-8% of the weight of the dispersion.

The effect of the cross-linking chemicals on the water resistance of the dispersions and, correspondingly, on the water resistance of board coated with the dispersion is studied in Examples 6 and 8.

In the manner described, hydrophobic starch dispersions can be prepared, containing as the starch component a starch ester, starch ether, mixed ester/ether of starch or grafted starch, which is prepared from native starch, hydrolysed starch, oxidized starch, cross-linked starch or gelatinised starch. Hydrophobic polymer dispersions can also be prepared from other biodegradable polymers, such as polycaprolactone, lactic acid polymers, lactic acid based polyester urethanes, polylactide, cellulose acetate and/or polyhydroxybutyrate/-valerate. The latter polymers can, of course, be used in mixtures with starch polymers. Hydrophobic polymer dispersions containing a starch ester and a hydroxyalkyl starch ester are particularly advantageous to provide. The method suits powdery starting materials in particular.

Alkenyl succinic acid anhydride can also be used as a plasticizer in a finished commercial dispersion, such as ethyl cellulose dispersions.

Preparation of Solutions

A polymer (the examples are described in section "Preparation of dispersions") and a plasticizer are dissolved in a suitable solvent, and the solution is mixed/shaken until the polymer is completely dissolved. The selection of the solvent varies in accordance with the polymer used and the degree of substitution thereof. The content of polymer in the solution is affected by its interaction with the solvent and the plasticizer. A very viscous solution is formed, when the compatibility of the polymer with the substances in question is good. In order for such a polymer solution to suit the preparation of films, for example, the polymer content in the solution should be kept relatively low (generally <10%).

Compositions of Dispersions and Solutions

In the composition according to the invention, the starch or its derivative, which in the following is also called a starch component, can be based on any native starch, the amylose content of which is 0-100% and the amylopectin content 100-0%. Accordingly, the starch component can originate in barley, potato, wheat, oat, pea, maize, tapioca, sago, rice or a similar tuber-baring or grain plant. It can also be based on starches that are prepared from the said native starches by oxidizing, hydrolysing, cross-linking, cationizing, grafting, etherifying or esterifying.

It has been found advantageous to use a starch-based component that originates in an ester formed from starch and one or more aliphatic $C_{2-24}$ carboxylic acids. In that case, the carboxylic acid component of such an ester can be derived from a lower alkane acid, such as acetic acid, propionic acid or butyric acid or a mixture thereof. However, the carboxylic acid component can also originate from a saturated on unsaturated native fatty acid. Examples of these include palmitic acid, stearic acid, oleinic acid, linolic acid and mixtures thereof. The ester can also consist of both long- and short-chain carboxylic acid components. A mixed ester of acetate and stearate could be cited as an example. In addition to the acids, the corresponding acid anhydrides and acid chlorides and other similar reactive acid derivatives can also be used in forming the ester by means of a known method.

The manufacture of the fatty acid ester of the starch is carried out, for example, as presented in the publications Wolff, I. A., Olds, D. W. and Hilbert, G. E., The acylation of Corn Starch, Amylose and Amylopectin, J. Amer. Chem. Soc. 73 (1952) 346-349 or Gros, A. T. and Feuge, R. O., Properties of Fatty Acid Esters of Amylose, J. Amer. Oil Chemists' Soc 39 (1962) 19-24.

Starch acetates can be prepared by allowing the starch to react with acetanhydride in the presence of a catalyst. As catalyst, 50% sodium hydroxide is used, for example. Other known manufacturing methods of acetates that are presented in the literature of the field are also suited for the preparation of starch acetate. By varying the amount of acetic acid anhydride, the amount and the reaction time of the base used as catalyst, starch acetates having different degrees of substitution can be prepared.

According to a preferred embodiment, the starch component is an esterified starch, preferably a starch acetate with a degree of substitution of 0.5-3, advantageously 1.5-3, and most preferably 2-3. In the preparation of starch esters, it is particularly advantageous to use an enzymatically hydrolysed barley starch, for example.

According to another preferred embodiment, the starch component is a hydroxyalkylated starch or its ester. In that case, particularly preferred components include hydroxypropyl starch, whose molar degree of substitution is not more than 1.4, preferably not more than 1, and hydroxypropyl starch esters, whose molar degree of substitution is not more than 1.4, preferably not more than 1, and especially preferably 0.1-0.8, and the degree of substitution is at least 2, preferably 2.5-3.

When the dispersions are prepared from starch or its derivatives, a plasticizing agent is included in the dispersion composition, its amount being as much as 2 times the mass of the polymer. However, the most preferable amount of plasticizer is 0.01-95% by weight, preferably about 1-50% by weight of plasticizer of the mass of the polymer or the dry matter. Generally, the amount is. 70% by weight of the dry matter or less. At least 10% by weight, preferably about 10-95% by weight of this plasticizer component consists of alkenyl succinic anhydride. The softener facilitates the dispersion by softening the polymer particles, improving the stability and the film-forming properties.

According to a preferred embodiment of the invention, the amount of softener included in the starch and cellulose based solutions is 0.01-90% by weight, especially 0.1-80% by weight (of the polymer's mass), preferably about 30-70% by weight. 10-100% of this plasticizing component consists of alkenyl succinic anhydride.

The alkenyl succinic anhydride used in the invention can have the formula (I), for example, (I)

wherein R can be a linear or branched alkenyl group having 3-24 carbons.

The alkenyl succinic anhydride can also have the formula (II)

(II)

wherein
R can be a linear or branched alkenyl group having 3-24 carbons, and
$R_1$ and $R_2$ can be, independent of each other, hydrogen or a linear or branched alkyl or alkenyl group, which has 1-10 carbons, and which can have one or more functional groups.

As an example of a suitable compound, an anhydride of n-octenyl alkenyl succinate should be separately mentioned.

In the manufacture of dispersions, alkenyl succinic anhydride is preferably used together with another plasticizing agent. The amount of this is about 5-90% of the total amount of plasticizer. Any known plasticizers can be used, of which the following can be mentioned as examples: triacetin, diacetin, monoacetin, triethyl citrate, tributyl citrate, acetyl triethyl citrate, acetyl tributyl citrate, dimethyl succinate, diethyl succinate, oligo esters of succinic acid and diols, ethyl lactate, methyl lactate, fatty acids of glycerol, castor oil, olive oil, rapeseed oil, tall oil, dibutyl phthalate, diethyl phthalate and mixtures thereof. Another softener component is not necessarily needed in the solutions.

The starch dispersion further contains a dispersion admixture, which can be used to disperse the biopolymer in sufficiently fine particles in water to form a stable dispersion. The dispersion admixtures are surface-active agents and protective colloids. The surface-active agents that should be cited include: cationic, anionic and non-ionic tensides, such as polyoxyethylene derivatives (polysorbates, polyoxyethylene alcohols), saponin, alkyl sulphonates, alkyl benzene sulphonates, fatty acid soap, lignosulphonates, sarcosinates, fatty acid amines and amides, phospholipids, saccharine lipids, lecithin and/or ligneous extracts. The amounts of surfactants are usually about 0.1-20%, preferably about 0.5-15%, of the mass of the biopolymer.

As an example of suitable protective colloids, polyvinyl alcohol (PVA) may be cited, in particular PVA, whose weight-average molar mass is about 10 000 to 115 000, as well as cationic starch and hydroxyalkyl starch and hydroxyalkyl cellulose, which can be used separately or together with PVA. The dispersions may further contain alkyl etene dimer (AKD) wax, beeswax or carnauba wax as additives or admixtures. Typically, these are in amounts of about 1-80%, preferably about 2-60%, in particular about 5-30% of the weight of the polymer.

As an example of advantageous polymer dispersion compositions, a composition may be cited containing 5 to 50 parts by weight of a starch ester,
0.1-50, preferably 5-50 parts by weight of a plasticizer,
1 to 150 parts by weight of water, and
0.1-20 parts be weight of a dispersion admixture.

Typically, the amount of water is about 2 to 10 times, preferably about 4 to 6 times, the amount of plasticizer is about 0.1 to 2 times, and that of the admixture about 0.1 to 1.5 times the amount of biodegradable polymer. Thus, as an example of the preparation of hydrophobic starch ester dispersion, it can be stated that about 1.0 to 5 kg of starch ester, 0.5 to 5 kg of plasticizer, and about 0.1 to 1.5 kg of admixture may be dispersed in 10 kg of water.

Depending on the intended use, 0.01 to 30% by weight, preferably about 5 to 30% by weight of a cellulose ester, such as cellulose acetate, cellulose propionate or cellulose butyrate, or mixed esters thereof can further be included in such polymer dispersion.

The dispersions can further contain admixtures and/or additives known as such in the plastics technology. Tall resins and their derivatives can be used to improve the adhesive abilities of the dispersions. As tall resins have double bonds, they also improve the drying properties of the dispersions. Typically, the amount of tall resins is 1-50%, preferably about 5-30% of the weight of the biopolymer. In paint applications, the dispersions may include alkyd compounds (binders generally used in paints and printing inks) in an amount of 0.1-80% of the amount of starch or corresponding biopolymer. Typically, these are condensation products formed from bivalent acid polyol (glycerol or pentathritol) and fatty acid and native oil. As an example, a fatty acid ester of pentaerythritol can be cited.

The invention can be used to provide dispersions of biodegradable polymers, starch derivatives in particular, more preferably dispersions of starch esters, wherein 90% of the polymer particles are smaller than 10 μm. By homogenisation, dispersions are provided, which have particle sizes of approximately less than 2 micrometers (μm) or even less than 1 μm. Depending on the intended use, dispersions can further be prepared, which have a multi-modal, in practice, mainly bi-modal particle size distribution.

Properties of Dispersions and Solutions

In spite of various additions of plasticizers that are normally used, the polymer film, ethyl cellulose (EC), which controls the release of a pharmaceutical substance, forms a brittle film. However, by using the plasticizers presented in the invention, the alkenyl succinic acid anhydrides (ASA), it was possible to considerably increase the flexibility of both the solution- and the dispersion-based EC films for plasticizer contents of 30-70% that were studied. For example, for a 50% content of plasticizer, the tensility of the solvent-based EC-ASA film was 28%, but for a commonly used commercial plasticizer (triethyl citrate, TEC), only 13%. Furthermore, the film plasticized with ASA was almost 5 times stronger, and its tensile strength at break was two times higher than that of the film plasticized with TEC. Such a strong and flexible film is especially important, e.g., in preparations that control the release of pharmaceutical substances, as the coating has to endure strain from both the inside and the outside of the preparation without the film damaging or the release of the drug altering. The ASA films were also more impervious to humidity than the films plasticized with TEC, improving the stability of the product. Similar results were obtained for the starch acetate (SA) films both in mechanical and moisture permeability tests. The SA dispersions plasticized with ASA were considerably more stable, smaller polymer globules were obtained, and the water resistance of the film prepared from them was better and the moisture permeability lower than those of the films plasticized with the commercial plasticizer commonly used. Regarding film-coated tablets, it was also discovered that the coating plasticized with ASA had both a better water resistance and capacity to effectively control the drug release compared with a dispersion, which was plasticized with triacetin, for example. A coating plasticized with triacetin, for example, was not at all capable of slowing down the release of the drug from the core preparation, because the water resistance of the formed film was extremely poor and the film was dissolved in water immediately after starting the test. Instead, the SA coat of the same thickness, which was plasticized with ASA, transmitted in eight hours only about 70% of the amount of the drug contained in the core. The only way to improve the water resistance of the film plasticized with triacetin, for example, was by means of a cross-linking reaction of the polyvinyl alcohol contained in the dispersion. However, as the dispersion containing the cross-linking agent (e.g., glutar aldehyde) was not stable and thus did not keep, it was necessary to cause the cross-linking reaction immediately before the coating process or the preparation of the film. Thus, an advantage of the dispersion plasticized with ASA is that there is no need for such an extra phase required by the cross-linking reaction, which even from the financial point of view would be inefficient.

In addition to pharmaceutical substances, fertilizers can also be considered as active ingredients. Regarding both pharmaceutical substances and fertilizers, the delayed release achieved by means of the invention is a fairly interesting advantage.

Generally, the thickness of the coatings and films is about 5-500 μm. Typically, the thickness of free films is about 10-200 am, e.g., about 20-150 μm.

The invention is illustrated by the following non-limiting examples.

The purpose of the tests conducted on solvent-based polymer films was to describe the interactions between the polymer and the plasticizer in particular.

The degrees of substitution of the starch acetates disclosed in the examples are defined in accordance with Wurzburg (Wurzburg, O. B, Acetylation, in Methods in Carbohydrate Chemistry, Vol. IV, edited by R. L. Whistler, Academic Press, New York and London, 1964, p. 288). The molar masses, in turn, are defined on the basis of a GPC analysis in the Alcohol Control Laboratory (ACL). The HP-1090 equipment, in a series of two columns (Waters, Ultra Hydrogel 2000), solvent 50 nM NaOH, temperature 40° C., dextran standards, RI and viscosity detectors as detectors. The molar mass is defined from the starch used as initial material.

Example 1

Solvent Films

Preparation and Appearance of Plasticized Polymer Films, and the Mechanical Properties of the Films Free films containing ethyl cellulose (two batches: EC and $EC_1$) and potato starch acetate (SA, DS 2.8) were prepared by the casting method by first dissolving in chloroform the polymer (EC, $EC_1$: 5%; SA: 2%) and the plasticizer [triethyl citrate, (TEC), n-octenyl succinate anhydride (OSA), 2-dodecyl succinate anhydride (DSA) and, correspondingly, dibutyl secabate DBS)]. The plasticizer contents studied were 10, 20, 30, 40, 50, 60, 70% of the mass of the polymer. The solution was poured on a Teflon mould and the solvent was evaporated at room temperature for 72 hours. The thickness of the films was about 180 μM.

Figure 1A:
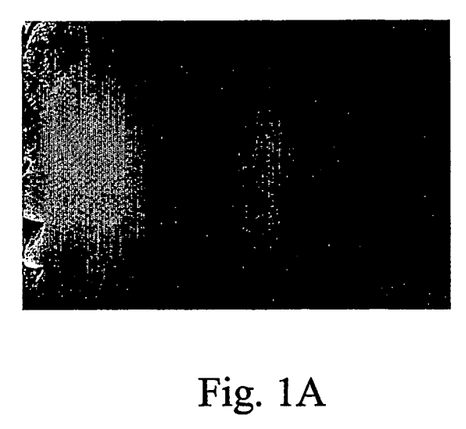
Figure 1B:
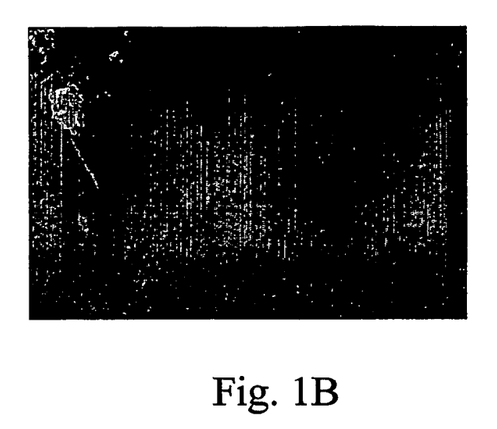

All EC films plasticized with the plasticizers studied were uniform and smooth. Except for the film plasticized with DBS, also the SA films were uniform (FIGS. 1A and 1B). The film plasticized with DBS was white and non-uniform and extremely brittle; therefore, no further studies could be carried out.

The effect of plasticizers on the mechanical properties of the films was studied by means of a CT5 loader (Engineering Systems, Nottingham, England). Rectangular samples (3.0 cm×1.4 cm) were cut from the films, and an elongation rate of 4.5 mm/min was used. A load-elongation curve was drawn for each sample, and the tensile strength, elongation, elasticity modulus, strength (AUC) and the tensile strength: elasticity modulus coefficient were defined from the curves. The results are shown in Table 1.

By using alkenyl succinic acid anhydrides (ASA), the flexibility of the EC films in particular could be improved for the plasticizer contents studied, as the above results indicate. Regarding a plasticizer content of 50%, e.g., the tensility of the OSA film was 28%, but for the commonly used commercial plasticizer (TEC) only 13%. In addition, the film plasticized with OSA was almost five times stronger, and its tensile strength was two times higher than that of the film plasticized with TEC. There was a considerable difference in the mechanical properties between the two ethyl cellulose batches studied; however, it indicated that the ASA's were considerably more efficient plasticizers compared with the commercial plasticizers commonly used. The plasticizers studied in the plasticizing of SA did not differ from each other as distinctively as was the case with EC—only the SA film plasticized with OSA was slightly more flexible and stronger than the other SA films.

Example 2

Solvent Films

Moisture Permeability of Plasticized Polymer Films

The films that were to be studied were prepared as in Example 1. The moisture permeability of the films was defined at a relative humidity of 57.5% at a temperature of 25° C. by means of gravimetric determination. An exact amount of calcium chloride was metered into a glass flask, which was tightly closed with the film that was studied, and placed in research conditions. The moisture permeability was observed as an increase in mass (the amount of water bound by the calcium chloride). The flasks were weighed at certain intervals during four weeks. A graph, which illustrated the moisture penetrating the film vs. time, was used to calculate the angular coefficient (S). The moisture conductivity factor was calculated by the formula III $$WVTR = h \times S/A \qquad (III)$$

TABLE 1

Mechanical properties of plasticized ethyl cellulose (EC, $EC_1$) and starch acetate (SA) films. (S.D. in brackets; n = 3-7)

| Plasticizer % (w/w) | | Tensile strength, σ (MPa) | Tensility (%) | Elasticity modulus, E (MPa) | Strength, AUC (MJ/m³) | σ/E coefficient (×10⁻²) |
|---|---|---|---|---|---|---|
| EC, TEC | 30 | 10.1 (1.1) | 4.5 (0.7) | 279 (60) | 0.2 (0.1) | 3.7 (0.7) |
| | 40 | 5.2 (1.0) | 11.5 (1.8) | 117 (26) | 0.4 (0.1) | 4.5 (0.4) |
| | 50 | 3.1 (0.6) | 12.7 (1.5) | 73 (16) | 0.3 (0.1) | 4.4 (0.5) |
| | 60 | 1.8 (0.1) | 13.9 (3.2) | 35.1 (8.4) | 0.2 (0.0) | 5.4 (1.4) |
| | 70 | 1.4 (0.2) | 26.4 (4.7) | 9.2 (3.0) | 0.2 (0.0) | 15.8 (4.2) |
| EC, OSA | 30 | 13.4 (3.7) | 8.3 (0.9) | 276 (30) | 0.5 (0.1) | 4.8 (0.9) |
| | 40 | 10.8 (1.3) | 11.2 (2.7) | 195 (35) | 0.8 (0.3) | 5.6 (0.7) |
| | 50 | 6.7 (0.8) | 28.0 (4.4) | 71 (19) | 1.4 (0.2) | 9.8 (2.5) |
| | 60 | 4.8 (1.8) | 56.9 (8.9) | 31 (17) | 2.0 (0.6) | 16.7 (4.4) |
| | 70 | 2.2 (0.5) | 100.7 (8.5) | 8.9 (2.9) | 1.8 (0.4) | 25.6 (4.4) |
| $EC_1$, TEC | 50 | 1.4 (0.2) | 23.5 (3.2) | 13.1 (3.7) | 0.2 (0.1) | 11.0 (2.2) |
| $EC_1$, OSA | 50 | 2.3 (0.3) | 82.5 (15.5) | 12.6 (2.6) | 1.6 (0.4) | 18.9 (3.0) |
| $EC_1$, DBS | 50 | 1.0 (0.1) | 14.2 (1.5) | 18.0 (3.6) | 0.1 (0.0) | 5.8 (0.6) |
| $EC_1$, DSA | 50 | 2.9 (0.4) | 54.7 (6.0) | 18.0 (4.7) | 1.2 (0.2) | 16.7 (3.2) |
| SA, TEC | 40 | 18.1 (1.3) | 9.5 (1.5) | 323 (28) | 1.2 (0.3) | 5.6 (0.3) |
| | 50 | 13.5 (0.6) | 11.3 (3.0) | 258 (17) | 1.1 (0.4) | 5.2 (0.3) |
| | 60 | 6.9 (0.5) | 17.2 (7.4) | 136 (19) | 0.8 (0.5) | 5.2 (0.7) |
| | 70 | 2.0 (0.2) | 90.7 (7.4) | — | 1.2 (0.2) | — |
| SA, OSA | 40 | 14.9 (3.6) | 8.5 (2.9) | 266 (25) | 0.8 (0.4) | 5.6 (1.0) |
| | 50 | 9.0 (1.8) | 27.2 (4.5) | 156 (36) | 1.9 (0.5) | 5.8 (0.7) |
| | 60 | 6.1 (1.4) | 48.8 (12.8) | 97 (29) | 1.6 (0.8) | 6.5 (1.3) |
| | 70 | 3.0 (0.8) | 69.4 (9.2) | 22 (14) | 1.7 (0.6) | 16.8 (6.4) |
| SA, DSA | 50 | 9.1 (0.4) | 11.1 (1.5) | 211 (16) | 0.7 (0.1) | 4.3 (0.5) | wherein h is the film thickness and A is the surface area of the film, whereby the unit is obtained: (mg×mm)/(cm²×24 h).

Figure 2A:
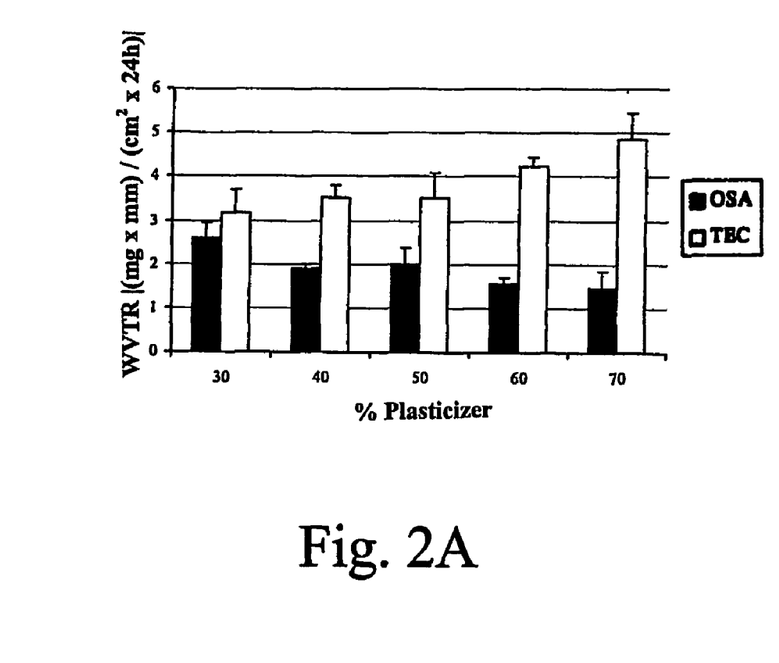
Figure 2B:
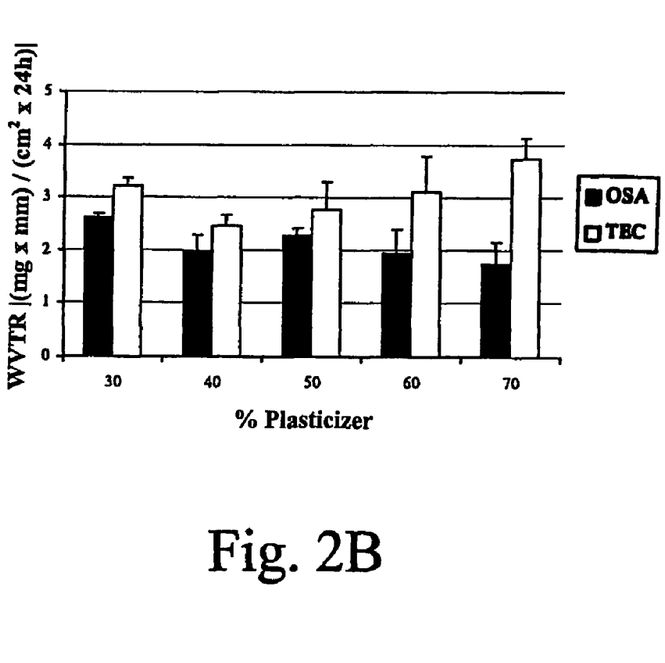

The films plasticized with OSA were tighter than those plasticized with TEC, for example, as their moisture permeability was considerably lower (FIG. 2). This is to indicate that OSA is compatible with both EC and SA, and the film becomes uniform.

Example 3

Extrusion Coating with Starch/Cellulose Acetates Plasticized with Alkenyl Succinate A mixture of starch acetate and cellulose acetate (5:3) was plasticized with triacetin, a mixture of triacetin and octenyl succinate (1:1) and, correspondingly, with octenyl succinate by the Berstorff 2 screw extruder. The ratio of polymer and plasticizer by parts of weight in each case was 80:20. Extrusion coating tests were conducted on the plasticized products on the extrusion line of TUT. As the lower web, 250 g/m² EnsoCup board was used. The amount of coating in each case was 35 g/m².

The quality of the coating was assessed by means of observing the number of pinholes. No pinholes were observed in the coatings containing OSA, whereas the polymer plasticized with triacetin only contained a large number of them. The coating was measured for the water vapour transmission rate (at room temperature in a relative humidity of 75%) and water absorption of 60 s (Cobb 60). The results are shown in the Table 2 below.

TABLE 2

Properties of coatings

| Coating plasticizer | Water vapour transmission rate g/m², 24 h | Water absorption Cobb60 g/m² | Pinholes in coating piece/m² |
|---|---|---|---|
| Triacetin | 400 | 3.4 | 700-900 |
| Triacetin-OSA | 320 | 3.1 | 0 |
| OSA | 250 | 0.9 | 0 |

As shown in the table, the water resistance and water vapour transmission rate values of the coating are distinctively better in coatings that contain OSA.

Example 4

The use of alkenyl succinate in the preparation of polymer dispersions and its effect on the properties of the dispersion
a) Preparation of hydroxypropyl starch acetate dispersion by using octenyl succinic acid anhydride and triethyl citrate as plasticizers At the initial stage, the following materials are combined:

| | |
|---|---|
| 1.50 kg | Starch-HPS-triacetate (C6LN100) |
| 0.15 kg | 40-88 Mowiol (polyvinyl alcohol) |
| 0.90 kg | water |
| 0.90 kg | Plasticizer mixture: 43.4% n-OSA and 56.6% triethyl citrate |

The mixture is mixed for 3 h at a temperature of 95-98° C., whereby a homogeneous viscous paste is formed. The temperature of the paste is kept at 75-95° C. and 0.40 kg of water is fed in so as to form a strong dispersion. The dispersion is cooled to a temperature of 50-60° C. and diluted within 2 h by gradually feeding into the dispersion 1.50 kg of cold water. At the same time, the dispersion is slowly cooled by means of a flow of water; the final temperature is 25-30° C. The end result is a viscous 52% dispersion, which has a considerably small particle size. When studied by light microscopy at an enlargement of 400×, the dispersion can be observed to contain a few occasional particles of 10 μm. AFM imaging showed that the particle size was between 150-1000 nm.

The dispersion was stable for more than 6 months.

On a glass plate, the dispersion forms a film as clear as glass, which under the effect of heat becomes water-resistant. The films were kept in a convection oven at 100° C. for various lengths of time, after which waterproof tests of 60 sec and, correspondingly, 300 sec were conducted by means of a drenched paper towel. If the water absorption of the film is high, a grey colour is observed at the moistened spot.

| | | |
|---|---|---|
| 1. | 6 h/100° C. | grey/60 s |
| 2. | 7 h/100° C. | grey/60 s |
| 3. | 8 h/100° C. | some greyness/60 s |
| 4. | 17 h/100° C. | clear/60 s/clear/300 s |

The water resistance properties of the dispersion coating were studied and by water absorption measurements. The results are shown in Table 3.

Amicus Office copying paper was coated by means of RK Control Coater equipment by using a wet film thickness of 4 μm. The dry content of the dispersion was 40%. Part of the dispersion was provided with an addition of 5% glyoxal as calculated from the dry matter. The coated pieces of paper were dried in an incubator at 100° C. for 60 min and, after that, kept in standard atmosphere 23° C./50% RH.

TABLE 3

Water-resistance properties of HPS-acetate based dispersion coating

| Test | Thickness of wet film μm | Water absorption Cobb60 g/m² |
|---|---|---|
| 0 Amicus Office | 0 | 20 ± 0.2 |
| Dispersion/Ex. 4a | 4 | 14.6 |
| Dispersion/Ex. 4a) + 5% glyoxal | 4 | 13.0 | b) Preparation of hydroxypropyl starch acetate dispersion by using triethyl citrate as plasticizer (a reference example for section 4a)

At the initial stage, the following materials are combined:

| | |
|---|---|
| 1.50 kg | Starch HPS triacetate (C6LN100) |
| 0.15 kg | 40-88 Mowiol (polyvinyl alcohol) |
| 1.05 kg | Water |
| 1.20 kg | Triethyl citrate |

Starting materials are mixed for 3 h at a temperature of 95-98° C., whereby a homogeneous viscous past is formed. The temperature of the paste is set within 75-95° C., after which 0.60 kg of water is fed in so that a strong dispersion is obtained. The dispersion is cooled down to 50-60° C. and diluted within 2 h by gradually feeding into the dispersion 1.2 kg of cold water. At the same time, the dispersion is slowly cooled by means of a flow of water; the final temperature is 25-30° C.

The dispersion is homogeneous immediately after the preparation, but its viscosity begins to increase during storage and the dispersion looses its stability within about 3 months. The water-resistance properties of a film made of the dispersion are poorer than those of the films made of the dispersions according to section 4a. The film is dissolved in the water absorption test.

c) Preparation of hydroxypropyl starch acetate dispersion by using octenyl succinic acid anhydride and poly(diethylene glycol succinate) as plasticizer At the initial stage, the following materials are combined

| | |
|---|---|
| 1.5 kg | Potato starch HPS acetate (C6LN100) |
| 0.9 kg | Water |
| 0.14 kg | 40-88 Mowiol (polyvinyl alcohol) |
| 0.59 kg | polyDEGS (poly(diethylene glycol succinate) |
| 0.46 kg | n-OSA |

The mixing time at 95-98° C. is 4 h. A homogeneous viscous paste is formed, into which 0.70 kg of water is fed within 1 h in the range of 78-95° C. As a result, a white strong dispersion is obtained. 1.1 kg of water is fed in within 2 h in the range of 60-30° C. As a final result, stable polymer dispersion (with a dry content of 50%) is obtained.

Dispersion coating tests of board (ENSO CUP) were conducted using the pilot coating machine of the Tampere Technical University (TUT) and the dispersions according to examples 4a) and 4b); the results were analysed in the paper laboratory of TUT by means of standard methods. Before coating, the dry content of the dispersions was set at 40% and 7.5% of glyoxal was added into them, calculated from the dry matter of the dispersion.

Talc was added as filler into the dispersion according to example 4a), whereby talc suspension delivered by Mondo Minerals with a dry content of 61.9% was added in an amount of 0.78 parts by volume per a 2.6 parts by volume of the dispersion.

d) Preparation of starch acetate dispersion with octenyl succinic acid anhydride and triethyl citrate as plasticizer At the initial stage, the following materials are combined:

| | |
|---|---|
| 5.0 kg | Starch acetate (C6N100) |
| 0.6 kg | 40-88 Mowiol (polyvinyl alcohol) |
| 3.0 kg | Water |
| 4.0 kg | Plasticizer mixture: 43.4% n-OSA and 56.6% triethyl citrate |

The mixture is mixed for 0.5 h at 20° C. by using a clod crusher. The temperature of the mixture is elevated to 95-98° C. for 4 hours, whereby a homogeneous viscous paste is formed. The temperature of the paste is set within 75-95° C. and 2.0 kg of water is fed into the paste during about 1-1.5 h, whereby a strong dispersion is obtained. The dispersion is cooled down to a temperature of 50-60° C. and diluted within 2 h by gradually feeding into the dispersion 2.0 kg of cold water. Another 2.0 kg of water is added, while slowly cooling the dispersion with a flow of water; the final temperature is 25-30° C. The dry content of the dispersion was 49%.

Figure 3:
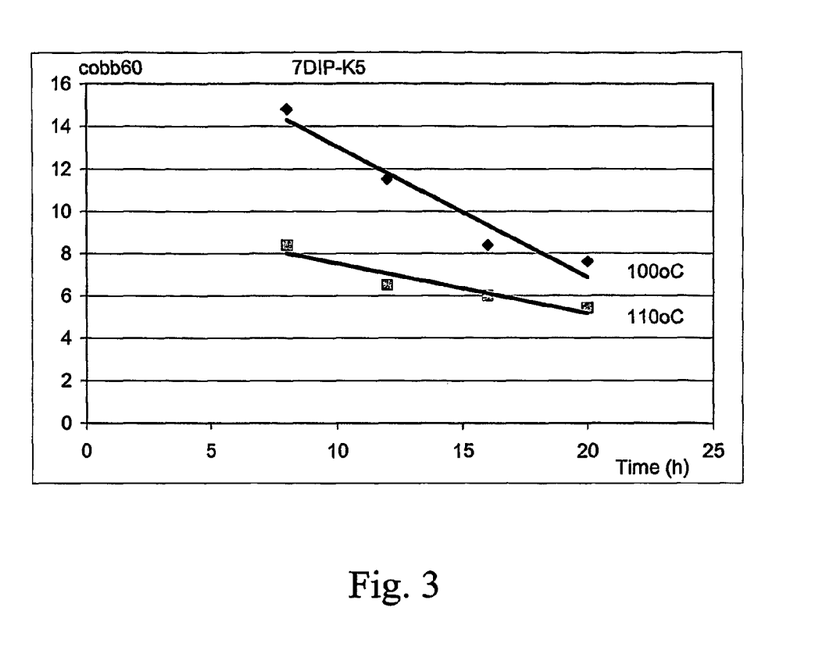
FIG. 3 shows the water absorption of a board coated with dispersion at two different temperatures.

Paperboard was coated with the dispersion according to Example 4 d), and the decrease in its water adsorption was followed as a function of time and temperature. The water absorption was measured by means of the Cobb60 test. The results are shown in FIG. 3.

The results indicate that the water resistance of the film improves as a function of time. When heated at 100° C., the water absorption lowers from a level of about 15 g/m² to a level of about 7.5 g/m² as measured by the Cobb60 test. No cross-linking chemicals are needed to achieve a good water resistance.

e) Preparation of a dispersion from native potato starch acetate by using triacetin as plasticizer; a reference test for Example 4 d).

| Formula: | |
|---|---|
| Starch acetate | 1.50 kg (COHPOL C6N100) |
| Water | 0.90 kg |

TABLE 4

Water-resistance properties of dispersion coatings that contain alkenyl succinic acid anhydride

| Test | Coating g/m² | Water absorption Cobb60 g/m² | Water absorption Cobb300 g/m² | $H_2O$ vapour permeability g/m², 24 h | $H_2O$ vapour permeability/ m², 48 h | $H_2O$ vapour permeability g/m², 7 h |
|---|---|---|---|---|---|---|
| 0 Enso Cup | 0.0 | 28.5 | 57.8 | 741 | 667 | |
| Ex. 4a | 9.5 | 4.9 | 20.4 | 304 | 295 | |
| Ex. 4c | 11.0 | 5.0 | 17.1 | 318 | 317 | |
| Ex. 4a + talc | 12.5 | 4.5 | 17.9 | 208 | 200 | 198 |

The Cobb60 and Cobb300 tests: Standard Tappi T 441 om-90
Water vapour transmission test: Standard Tappi T 448 om-89

On the basis of the results, alkenyl succinate is compatible with various plasticizing agents and the water-resistance properties of boards coated with dispersions containing the same show a distinctive improvement even on small amounts coating. Furthermore, the dispersions can be filled with inorganic minerals, further improving the water vapour transmission properties of the dispersions.

-continued

| | | |
|---|---|---|
| Mowiol 40-88 | 0.18 kg | |
| Triacetin | 1.20 kg | |
| | 3.86 kg | % $H_2O$: 23.3% |

-continued

| Into a homogeneous past 100° C. (the assessed reaction time 5-6 h) | |
|---|---|
| 0.6 kg Water | Heat dilution t (min.) 70° C. t: (max): 90° C. |
| 0.6 kg Water | Dilution by cooling t (min) 45-50° C. |
| | Water Content: 41.5% (strong dispersion) |

Final dilution: 50% was set as the water content of the dispersion (the adjustment of viscosity took place at a temperature of about 20° C.).

The dispersion does not form water-resistant films without cross-linking chemicals.

Example 5

Particle Size of Dispersions and Stability Thereof

The preparation of starch acetate dispersions is described in Examples 4d and 4e. It was possible to considerably decrease the globule size of the dispersions by using OSA in addition to a commercial plasticizer. For example, the globule size of an SA dispersion that was plasticized with triacetin became 1.71 μm (numeric) and 2.3 μm (defined on the basis of volume), whereas the corresponding globule sizes for the dispersion plasticized with the mixture of TEC-OSA (about 1:1) were 0.6 μm and 1.7 μm. The smaller globule size is a prerequisite for forming a uniform film. The said dispersion kept stable in a cool place at least for 8 months. The dispersion plasticized with OSA kept stable for 4 months at room temperature; whereas two different phases were separated from the dispersion plasticized with TA as early as in six weeks. The dispersions contained the plasticizer or the plasticizer mixture in an amount of 80% of the mass of the polymer.

Example 6

Use of Different Polymers as the Polymer Component of Dispersions in Dispersions that Contain Alkenyl Succinic Acid Anhydride A mixture of n-OSA and triethyl citrate was used as plasticizer in the conditions according to Example 4 in the preparation of various polymer dispersions. The enclosed table shows some selected examples of the compositions.

TABLE 5

Dispersions prepared from various polymers by using alkenyl succinic acid anhydride (mixtures of plasticizing agents were used)

| Test | Polymer I | Polymer II | TEC, % | OSA, % | PVA, % | Stability of dispersion |
|---|---|---|---|---|---|---|
| Test 1 | Mowital 45 BH 52.0% | | 24.6 | 18.8 | 6.2 | + |
| Test 2 | Raibond-15 triacetate 52.0% | | 24.6 | 18.8 | 6.2 | + |
| Test 3 | Raibond-15 triacetate 26.2% | C6N100 26.2% | 24.7 | 18.9 | 5.8 | + |
| Test 4 | Raibond-15 triacetate 55.6% | | 26.2 | 20.0 | 0.0 | + |

Mowital BH is a polyvinyl alcohol butyral (Clariant), C6N100 is starch acetate DS 2.8, which is prepared from potato starch, Raibond-15 triacetate is a starch acetate, $Ds_{kat}$ 0.2 and $DS_{asset}$ 2.8, prepared from a cationic starch of Raisio Chemicals Oy.

The results show that alkenyl succinic acid anhydride together with triethyl citrate is suitable for the preparation of quite different polymer dispersions. If a starch derivative has, in addition to ester groups, also cationic functionality, a protective colloid is not necessarily needed in the dispersion for the preparation of a stable dispersion.

The cationic starch acetate dispersion (Example 6, Test 4) can be used for coating paper and board. The coated board was dried in an incubator (100° C./60 min) and its water absorption was measured by the Cobb60 test. The water absorption was decreased by about 70% compared with uncoated board (Table 6).

TABLE 6

Water resistance of ASA dispersion coating prepared from cationic starch acetate

| Board | Amount of coating g/m² | Cobb60, g/m² |
|---|---|---|
| Enso Cup 0 sample | 0.0 | 28.5 |
| Dispersion coating; test 4 | 5.0 | 7.9 |

Example 7

Dispersion Films

Preparation and Drug Penetrability of Starch Acetate Dispersion Films

Free films were prepared from the water dispersions of potato starch acetate (DS 2.8) for studying their drug penetrability by casting diluted dispersion on Teflon moulds, after which water was evaporated at 60° C. for 24 hours. The thickness of the films thus prepared was about 120 μm. Permeability tests were conducted by means of side-by-side diffusion chambers, wherein the film to be studied was placed between the chambers, the drug solution on the donating side of the chamber, and a clean buffer (pH 7.5) on the receiving side. Samples were taken from the receiving side at certain intervals up to 24 hours. The coefficient of permeability (P) was defined for the drug penetrability by means of the following formula:

$$P=(dM \times h)/(dt \times A \times C_d) \qquad \text{IV}$$

wherein
M is the amount of drug penetrating the film in time t,
h is the thickness of the polymer film,
A the diffusion surface area (0.64 cm²) and
$C_d$ is the drug content of the donator at a point in time of 0.
In that case, the unit obtained is cm²/s.

The film prepared from the dispersion plasticized with triacetin (TA) (the preparation is described in Example 4e) was immediately broken, when placed in the buffer, indicating imperfect film formation and an extremely poor water resistance. It was not possible to define the drug penetrability of these films. The film formation of the dispersion in question and also the water resistance of the film could be improved by cross-linking the polyvinyl alcohol (PVA) contained in the dispersion by means of glutaric dialdehyde (42% of the mass of the PVA). In that case, the permeability coefficient of the hydrophobic propranolol was $1.95 \pm 1.19 \times 10^{-7}$ cm$^2$/s and that of the hydrophilic mannitol 0.70±0.80*10$^{-7}$ cm$^2$/s. However, the large deviation in the results was an indication of the non-uniformity of the films.

When the SA dispersion (preparation described in Example 4d) was plasticized with a mixture of TEC-OSA (about 1:1), the film thus formed was uniform and water-resistant; therefore, no cross-linking of PVA was needed.

The permeability coefficient of propranolol was 6.34±0.77*10$^{-7}$ cm$^2$/s and that of mannitol 8.18±0.55*10$^{-7}$ cm$^2$/s. The sample substances supposedly permeated the film through the water channels formed in the film, which, in turn, were formed after the hydrophilic substances contained in the dispersion were dissolved.

Example 8

Dispersion Films

Mechanical Properties of the Starch Acetate and Commercial Ethyl Cellulose Dispersion Films Free films were prepared from water dispersions of potato starch acetate (DS 2.8) and commercial ethyl cellulose dispersions (Aquacoat®, Surelease®) for studying their mechanical properties by casting diluted dispersion on Teflon moulds, after which the water was evaporated at 40° C. for 24 hours or at room temperature (22° C.) for 48 hours. The thickness of the films thus prepared was about 170 μm. The mechanical properties of the films were tested by means of the method described in Example 1.

Figure 4A:
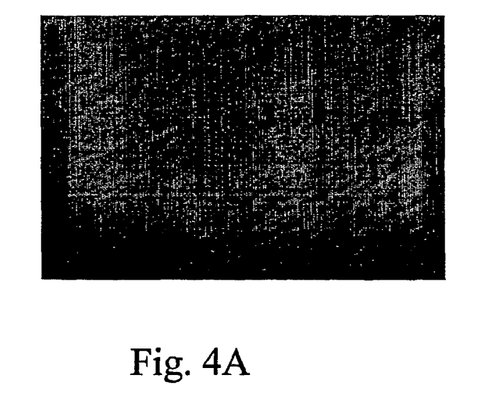

The SA films plasticized with the mixture of TEC-OSA (preparation of the dispersion described in Example 4d) were clear and extremely flexible (FIG. 4A, Table 7). Slow evaporation (drying at 22° C.) seemed to further improve the film formation, and the films were extremely elastic without any signs of their strength decreasing. This proved that the SA dispersion has a very low film-forming temperature (<22° C.).

Figure 4B:
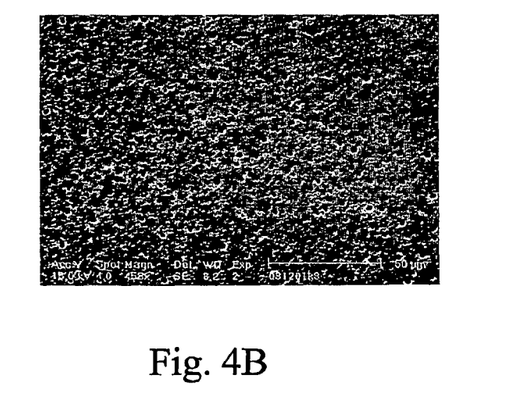

The SA films plasticized with triacetin (preparation of the dispersion described in Example 4e) were non-transparent, which proved that the film-forming property was poorer compared with those plasticized with OSA. Examination by a light microscope and SEM indicated that the SA films plasticized with TA were extremely porous and non-uniform (FIG. 4B). This was shown as weaker elasticity and strength (Table 7). The cross-linking of PVA slightly impaired the film-forming ability of the dispersion plasticized with TA.

Regarding their mechanical properties, the EC dispersions differed considerably from both each other and from the SA dispersions. The EC dispersion, which the manufacturer had already plasticized, (Surelease, including triglycerides and oleinic acid as plasticizers) formed a yellowish and clear, even though hard and brittle film, whose tensility was a few percent only, and also the strength was extremely low compared with the SA films (Table 7).

Efforts were made to prepare cast films from EC dispersions not containing a plasticizer (Aquacoat) by plasticizing the dispersion either by DBS, TEC or OSA (30% of the dry weight of the dispersion). DBS was not completely mixed with the dispersion, and no film was thus formed but a very fractured, broken "film" was obtained instead. The film forming of the dispersion plascticized with TEC was also poor—the film cracked when cut, and no sample could be made for mechanical tests. Instead, the EC dispersion plasticized with OSA formed a uniform and clear film, which, however, seemed a little inhomogeneous. However, the distribution of the plasticizer into polymer globules could be improved by extending the mixing time before the dispersion was cast on the moulds. Thus, a cast film for mechanical testing could only be prepared from Aquacoat by means of OSA. The preparation of a cast film from Aquacoat has proven to be problematic before, which may be a consequence of the sedimentation of the EC globules during drying. In spite of these technical problems in manufacture, the Aquacoat film plasticized with OSA was more elastic and stronger than the Surelease film (Table 7).

TABLE 7

Mechanical properties of plasticized starch acetate (SA) and commercial ethyl cellulose (Surelease, Aquacoat) dispersion films; the cast free films were dried at 40° C. for 24 h. (S.D. in brackets; n = 4-7)

| Film | Tensile strength, σ (MPa) | Tensility (%) | Elasticity modulus, E (MPa) | Strength, AUC (MJ/m$^3$) | σ/E coefficient (×10$^{-2}$) |
|---|---|---|---|---|---|
| SA + TEC-OSA mixture 80% | 3.7 (1.04) | 93.6 (12.3) | 23.9 (4.4) | 2.5 (0.8) | 18.0 (7.8) |
| SA + TEC-OSA mixture 80%* | 3.4 (0.7) | 110.1 (17.6) | 15.7 (3.6) | 2.5 (0.8) | 23.6 (10.8) |
| SA + TA 100% | 3.2 (0.5) | 79.5 (18.9) | 37.5 (20.4) | 2.0 (0.7) | 10.3 (6.0) |
| SA + TA 100% + 6.3% glutaric dialdehyde | 2.8 (0.7) | 79.6 (10.0) | 74.2 (10.2) | 2.1 (0.4) | 3.8 (1.0) |
| Surelease ®, Colorcon (containing triglycerides and oleinic acid) | 3.1 (0.4) | 3.3 (1.2) | 141 (14) | 0.06 (0.03) | 2.2 (0.3) |
| Aquacoat ®, FMC (incl. NaLS, cetyl alcohol) + 30% OSA | 1.4 (0.6) | 11.9 (6.8) | 31.5 (15.5) | 0.09 (0.02) | 6.2 (2.0) |

*film was dried at 22° C. for 48 h

Example 9

Tablets Coated with Dispersion

Coating of Tablets and Release of Pharmaceutical Substance

Tablets (94% of microcrystalline cellulose, 5% of propranolol hydrochloride and magnesium stearate) were coated by dipping them into SA dispersion, after which they were dried at 60° C. for 24 hours. The functioning of the SA dispersions was also studied in air suspension coating (Aeromatic). The release of drug from the tablets was studied by a dissolution test (the basket method, intestinal juice without enzymes pH 7.5, USP 23).

Figure 5:
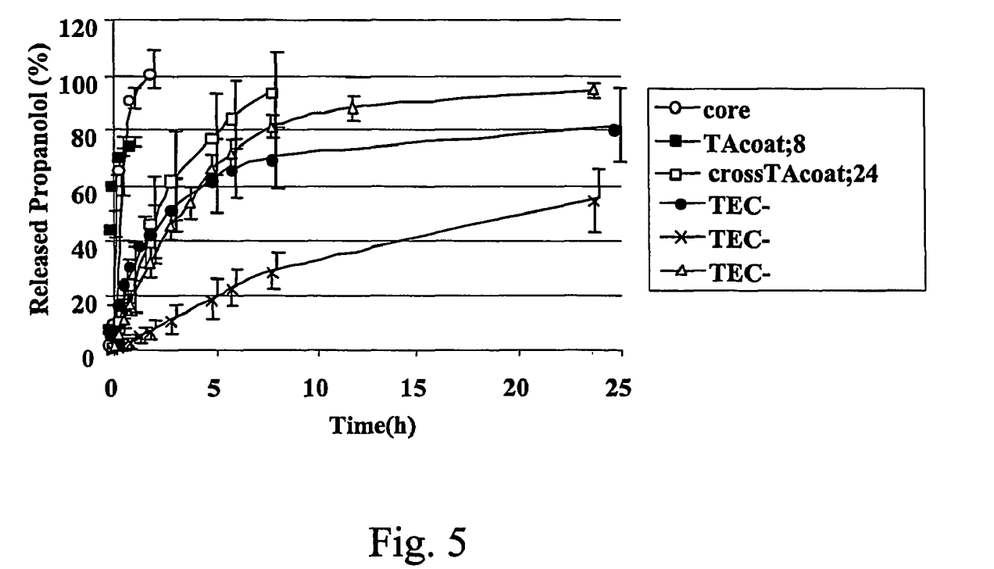
FIG. 5 shows the release of propranolol (5%) from uncoated tablets and tablets coated with starch acetate dispersions (mean value±SD; n=3-6). The percentage behind the graph identifier describes the increase in the mass of the preparation caused by the coating.

The drug was released from uncoated tablets in one hour (the core, FIG. 5). As the drug permeability test carried out with free films indicated, the water resistance of the coating plasticized with triacetin was poor, and it was not at all able to control the release of the drug from the tablet (TAcoat; 8%, FIG. 5). Cross-linking the PVA made it possible to improve the water resistance of the coating, even though the coating used was very thick—the increase in mass caused by the coating in the tablet was 24% (crossTAcoat.; 24%, FIG. 5). The coatings plasticized with the mixture of TEC-OSA controlled effectively the release of the drug, thus indicating an excellent film-forming capability of the dispersion. With an amount of coating of 8%, about 70% of the propranolol contained in the core were released in eight hours (TEC-OSAcoat; 8%, FIG. 5), but only 30% when the amount of coating was 15% (TEC-OSAcoat, 15%, FIG. 5). The air suspension method, the SA coating that was prepared by spraying and plasticized with the mixture of TEC-OSA effectively controlled the release of the sample drug—about 80% of the drug was released in 8 hours (TEC-OSAcoat; 9%, sprayed, FIG. 5).

Figure 6:
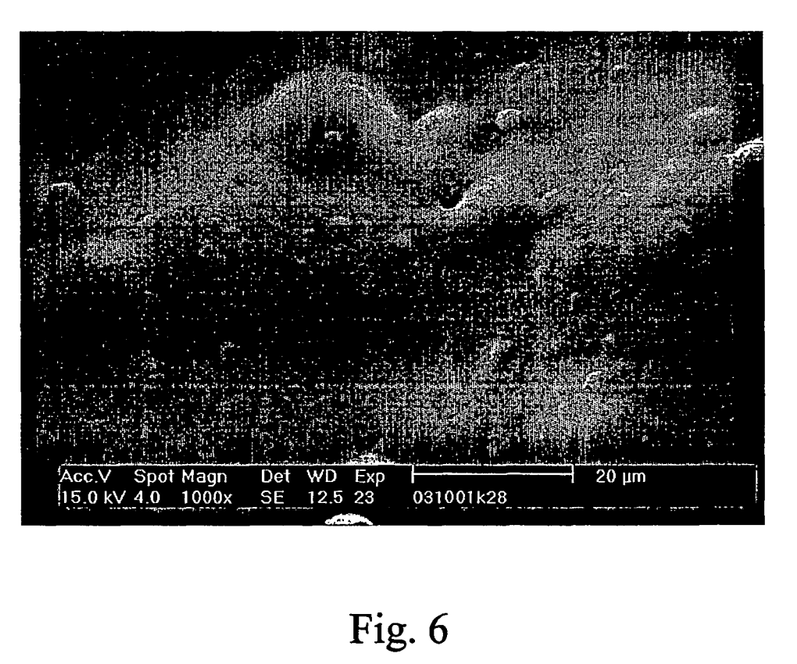
FIG. 6 shows an electron microscope image of the surface of a tablet coated with SA dispersion (plasticized with the TEC-OSA mixture). The tablet is coated with Aeromatic air suspension equipment. The enlargement is 1000×.

The excellent film-forming capability of the SA dispersion, which was plasticized with the mixture of TEC-OSA, could also be observed in SEM images, which indicated that the coating made by spraying was homogeneous and extremely smooth (FIG. 6). Thus, the coating made of the SA dispersion plasticized with OSA can be used to control the release of drug from the core preparation.

Spraying the TA-plasticized SA dispersion by means of an air suspension coater was very problematic, as the nozzle clogged already at the initial stage of coating. It may have been a result of the large globule size of the dispersion or the poor diluting capability of the dispersion with water. In spite of a continuous magnetic stirring, the dispersion began to sediment immediately after dilution and, supposedly, the aggregates thus formed clogged the nozzle, whereby it became impossible to complete the coating.

Example 10

Coating Mix for Paper or Board

The purpose of this test was to use the starch acetate dispersion as a binder in paper coating mixes.

The coating mix was prepared applying the formula described in the reference: Starch and starch Products in Paper Coatings; Robert L. Kearney and Hans W. Mayer ads.) TAPPI PRESS, p. 175. The polymer components of the mix were replaced with the dispersion (8DIP-99) according to Example 4 a), containing glyoxal in an amount of 10% of its dry matter. Table 8 shows the composition of the mix.

TABLE 8

Composition of the paper coating mix that was prepared

| Components | Amount (g) | Dry matter (g) |
|---|---|---|
| Clay slip Dry content 55% | 200 | 110 |
| Calcium carbonate | 46 | 46 |
| Water | 80 | |
| Dispersion according to Example 4 a) (+glyoxal 10%) Dry content 40% | 50 | 20 |
| Total | 376 | 176 |

Dry content of mix: 46.8%

Testing: As a coating on copying paper; rod No. 1; drying 30 min, 90° C.

Printing test: Hewlett Packard DeskJet 890C

Minerals adhered to the surface of the paper and the photograph was printed almost perfectly.

Example 11

Use of Alkenyl Succinate Dispersions in Sizing

A sizing test was conducted on the dispersion according to Example 4 a) by spreading the size by a rod applicator on the surface of the paper. The amount of size was 12 g/m$^2$. After spreading the size, another piece of paper was placed on top of the glue bond and the surfaces to be sized were pressed against each other by means of a roller technique, i.e., a 1 kg roller was pushed back and forth on the surface of the topmost paper of the glue bond. The glue bond was dried at 100° C. for 1 h and, thereafter, cooled down to room temperature. When the adhered pieces of paper were pulled apart, a 100% fibre fracture was observed in the paper; in other words, the test indicates that the dispersion can be used as a sizing agent for paper products.

Example 12

Preparation of Alkenyl Succinate Ester and Use Thereof as Plasticizer of Dispersion 12 a) Preparation of Alkenyl Succinate Ester Test 1. The ester of octenyl succinic acid anhydride and triethyl citrate 105.0 g of octenyl succinic acid anhydride (OSA), 135.0 g of triethyl citrate (TEC) and 45.5 g of pyridine were mixed and heated at 114-125° C. for 4 h. The reaction mixture was poured into a 0.5 N HCl solution (an equivalent amount with respect to the pyridine) and is vigorously mixed. The phases are separated. The raw product (TECOSA) is washed with water 3 times. After this, the reaction product was dried by azeotropic evaporation with methylbenzene at a low pressure. The procedure also removes any pyridine residues. The product was characterized by means of thin layer chromatography on thin silica gel layers with a 2% acetic acid in chloroform as an eluant. The distance travelled by the product on the layer deviated from the corresponding values of the starting materials and the octenyl succinic acid. No anhydride adsorption was visible in the FTIR spectrum of the product.

Test 2. Ester of Octenyl Succinic Acid Anhydride and Ethylene Glycol

Ethylene glycol (1 mol) and octenyl succinic acid anhydride (1 mol) and a catalytic amount of a para-toluene sulphonic acid are mixed at room temperature. The temperature is gradually increased to about 200° C. The water generated in the reaction is distilled off at low pressure (max 0.2 bar). The total reaction time was 13 h and the amount of distillate 55 ml. The acid number of the product was 32.3 mg of KOH/g of sample.

12 b) Use of Alkenyl Succinate Esters as Plasticizers

The dispersions according to Table 9 were prepared as in Example 4. The dispersions were stable for several months, indicating that also the esters of alkenyl succinic acid anhydride alone or together with other plasticizers are suitable for plasticizers of starch polymers.

TABLE 9

Composition of dispersions containing alkenyl succinate ester

| Identifier | Polymer % | Plasticizer 1. % | Plasticizer 2. % | Mowiol 40-88% | Stability of dispersion |
|---|---|---|---|---|---|
| Test 1 | C6LN100 47.2 | TECOSA 47.2 | — | 5.7 | + |
| Test 2 | C6LM100 47.4 | TECOSA 23.7 | Poly(ethylene glykol octenyl succinate) 23.7 | 5.2 | + |

In this table, TECOSA refers to the ester of octenyl succinic acid anhydride and triethyl citrate and poly(ethylene glycol octenyl succinate) is the polyester of ethylene glycol and octenyl succinic acid anhydride, the preparation of which being described in Example 12a. C6LM100 is hydroxypropyl starch acetate, $MS_{hps}$ 0.4, $DS_{acet}$ 2.7, which is prepared from cornstarch rich in amylose (Hylon VII, National Starch and Chemicals).

The invention claimed is:

1. A polymer dispersion or solution containing a hydrophobic polysaccharide selected from the group consisting of cellulose acetate and starch acetate, which is dispersed or dissolved in liquid phase, and a plasticizer for the polysaccharide, wherein at least 10% by weight of the plasticizer consists of alkenyl succinic anhydride or alkenyl succinate.

2. The polymer dispersion or solution according to claim 1, wherein the alkenyl succinic anhydride has the formula (I)

(I)

wherein R is a linear or branched alkenyl group having 3-24 carbons.

3. The polymer dispersion or solution according to claim 1, wherein the alkenyl succinate has the formula (II)

(II)

wherein R is a linear or branched alkenyl group having 3-24 carbons, and $R_1$ and $R_2$ can be, independent of each other, hydrogen or a linear or branched alkyl or alkenyl group, which has 1-10 carbons and which can have one or more functional groups.

4. The polymer dispersion or solution according to any of the preceding claims, wherein the plasticizer constitutes 10-70% by weight of the dry content of the dispersion or the solution.

5. The polymer dispersion or solution according to claim 1, wherein the plasticizer contains a second plasticizing component, which is triacetin, diacetin, monoacetin, triethyl citrate, tributyl citrate, acetyl triethyl citrate, acetyl tributyl citrate, dimethyl succinate, diethyl succinate, oligo esters of succinic acid and diols, ethyl lactate, methyl lactate, fatty acid esters of glycerol, castor oil, olive oil, rapeseed oil, tall oil, dibutyl phthalate, diethyl phthalate or a mixture thereof.

6. The polymer dispersion or solution according to claim 5, wherein the plasticizer contains an oligomeric plasticizing agent.

7. The polymer dispersion or solution according to claim 5, wherein the second plasticizing component constitutes, in the dispersion, 5-90%.

8. The polymer dispersion or solution according to claim 1, wherein the starch acetate contains cationic groups.

9. The polymer dispersion or solution according to claim 1, wherein the polysaccharide derivative is ethyl cellulose.

10. The polymer dispersion or solution according to claim 1, wherein the anhydride of alkenyl succinate is an anhydride of n-octenyl alkenyl succinate.

11. A polymer coating/coating for pharmaceutical preparations containing polysaccharides and/or polysaccharide derivatives selected from the group consisting of cellulose ethers, cellulose esters, starch ethers, and starch esters, wherein the plasticizer of the polymer contains an anhydride of alkenyl succinate or an alkenyl succinate.

12. The polymer coating according to claim 11, wherein the water vapour transmission rate of the coating is less than 300 g/m² in 24 h and Cobb60, the number describing the water absorption, is less than 3 g/m², while the amount of coating is at least 30 g/m².

13. A polymer dispersion or solution containing a hydrophobic polysaccharide selected from the group consisting of cellulose ether, cellulose ester, starch ether, or starch ester, which is dispersed or dissolved in liquid phase, and a plasticizer for the polysaccharide, wherein at least 10% by weight of the plasticizer consists of alkenyl succinic anhydride or alkenyl succinate.

* * * * *